United States Patent [19]

Shaffer

[11] 4,047,292
[45] Sept. 13, 1977

[54] PROCESS FOR FORMING AN ELECTRICALLY INSULATING SEAL BETWEEN A METAL LEAD AND A METAL COVER

[75] Inventor: Paul C. Shaffer, Seneca Falls, N.Y.

[73] Assignee: GTE Sylvania Incorporated, Stamford, Conn.

[21] Appl. No.: 743,306

[22] Filed: Nov. 19, 1976

[51] Int. Cl.$^2$ ............................................. H01B 17/26
[52] U.S. Cl. .................................. 29/630 R; 65/59 B; 65/61; 174/50.61; 174/152 GM; 429/174; 429/181
[58] Field of Search ................. 29/630 R, 630 D, 592; 65/59 B, 61; 174/50.61, 50.63, 52.5, 152 GM; 429/181, 174, 185, 184

[56] References Cited

U.S. PATENT DOCUMENTS

| 2,898,668 | 8/1959 | Knott et al. | 29/590 |
| 3,083,249 | 3/1963 | Belove | 429/94 |
| 3,225,132 | 12/1965 | Baas et al. | 65/59 B X |

FOREIGN PATENT DOCUMENTS 807,605  3/1969  Canada .............................. 65/59 B Primary Examiner—Victor A. DiPalma
Attorney, Agent, or Firm—Norman J. O'Malley; William H. McNeill; Robert T. Orner

[57] ABSTRACT

A metal body, for example, a cover for hermetically sealed electrochemical cells, is relatively flexible and electrically conductive. An aperture is provided within the body to receive an electrically insulating material, such as glass, which mounts a terminal or metal lead, for the cell. In the process for producing the seal, the body is positioned with the lead therein and a sealing glass is placed thereabout. The assembly is fired at a temperature high enough to achieve melting of said sealing glass and effecting a between the body, lead and glass to form a glass-to-metal seal. At least one surface of the lead is then ground to be flush with the glass and then the assembly is refired to heal cracks formed in the glass by the grinding operation.

4 Claims, 1 Drawing Figure

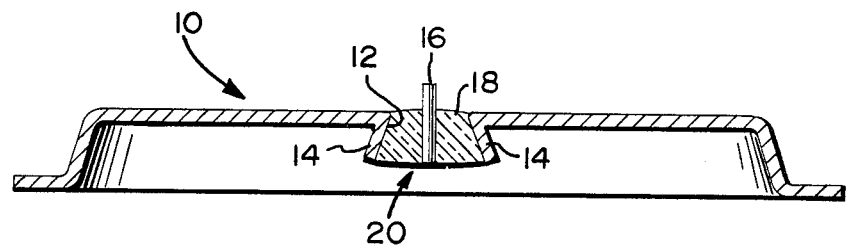

PROCESS FOR FORMING AN ELECTRICALLY INSULATING SEAL BETWEEN A METAL LEAD AND A METAL COVER

BACKGROUND OF THE INVENTION

This invention relates to processes for forming seals and more particularly to processes for forming glass-to-metal seals in covers for hermetically sealed electrochemical cells.

Modern electrochemical cells employ highly reactive materials such as lithium or other alkali metals. These cells use non-aqueous electrolytes which can be organic or inorganic. An example of a currently contemplated inorganic electrolyte is one comprised of a solvent of thionyl chloride containing a solute of lithiumaluminum tetrachloride. Carbon is often employed as the cathode in such cells.

Because of the high energy available from these reactive materials, cells employing them are readily adaptable to small sizes such as button cells. The term "button cell" is employed herein to mean cells having disc-like configuration with a diameter less than two inches (5.08 cm) and a thickness usually of less than one-half inch (1.27 cm).

Such cells are used in delicate electronic equipment such as watches, cameras, hearing aids and pacemakers where their small size and high capacity are most effective. In this equipment, which is often quite expensive and in contact with the human anatomy, it is extremely important that the cells remain leakproof so that the highly reactive ingredients thereof cause no harm.

In conventional cells of this type a container is employed which is electrically conductive metal and which forms one of the terminals of the cell. A cover of like material is welded to the bottom half of the container and thus assumes the same polarity. The other terminal projects through the cover and is isolated therefrom by means of an electrically insulating material such as rubber, neoprene, glass or ceramic. In those cells employing a glass or ceramic-to-metal seal, an aperture is provided in the cover. This aperture is larger than the diameter of the terminal to project therethrough and is filled with the glass or ceramic material. Obviously, the insulating material should have substantially the same thermal coefficient of expansion as the metal of the container.

The seal area of these cells has presented the most persistent leak problem associated with the cells. The glass seal develops cracks which sooner or later allow the elctrolyte to escape.

It has been determined that at least one cause of cracks in the glass seal is a grinding operation performed after the seal is made. The grinding operation is to insure that the inside surface of the terminal lead (i.e., the surface which will be at the interior of the complete cell) is flushed with the glass seal. Subsequently, an electrically conductive current collector is welded to this surface of the terminal lead.

OBJECTS AND SUMMARY OF THE INVENTION

It is, therefore, an object of the invention to obviate the disadvantages of the prior art.

It is another object of the invention to enhance the sealing of hermetic batteries.

Yet another object of the invention is the provision of a cover for an electrochemical cell having an improved seal.

Yet another object of the invention is the provision of a process for healing cracks formed in a glass seal by a grinding operation.

These objects are accomplished in one aspect of the invention by the provision of a process for producing glass-to-metal seals in an apertured metal body which comprises positioning the apertured metal with a substantially centrally located metal lead within the aperture. A sealing glass is placed in the aperture and the assembly is fired to melt the glass and effect a seal. Thereafter, the metal lead is ground flush with the glass and the assembly refired at a temperature at least as high as the initial firing to heal any cracks formed by the grinding operation.

BRIEF DESCRIPTION OF THE DRAWING

The single FIGURE is a cross-sectional view of a battery cover employing a glass-to-metal seal that can be formed by the process of the invention.

DESCRIPTION OF THE PREFERRED EMBODIMENTS

For a better understanding of the present invention, together with other and further objects, advantages and capabilities thereof, reference is made to the following disclosure and appended claimstaken in conjunction with the above-described drawing.

Referring now to the drawing with greater particularity, there is shown in the single FIGURE a metal body 10, such as a cover for a battery. The body 10 contains an aperture 12 which can have elongated walls 14 having a height greater than the thickness of body 10. A metal terminal lead 16 is substantially centrally located within aperture 12 and is maintained therein by means of a glass seal 18.

To form the seal, the body 10, which is of any suitable material such as stainless steel, Kovar, Rodar, etc., is placed on or in a suitable jig and the terminal lead 16 is substantially centrally located within aperture 12. A suitable quantity of an appropriate sealing glass; i.e., a glass having a thermal coefficient of expansion matching that of the metal body, is placed in the aperture 12. The glass can be in the form of a cylindrical collet or can be a powdered glass frit. The assembly is then heated to a sufficient temperature (usually greater than 700° C) for a sufficient time to melt the glass and form the seal. The heating or firing of the assembly can be done in a furnace or under a gas flame, the latter preferably while the assembly is being rotated.

After the initial completion of the seal, which employs known methods and materials, it becomes necessary, if the assembly is to be a battery cover, to insure that the inside surface 20 of the terminal lead 16 and glass seal 18 are flush. This is accomplished by a grinding operation.

It has been discovered that leaks which have developed in batteries employing covers made as described above have been through minute cracks formed in the glass seal by the grinding operation.

It is thus the purpose of this invention to heal these cracks. This is accomplished by refiring the cover assembly after the grinding operation has been performed. The time and temperature can be less than the original firing time and temperature but should at least be sufficient to bring the glass seal to a semimolten state. This process heals any cracks introduced into the seal by the grinding operation and reduces the number of leaks from this source.

As mentioned above, the sealing glass should be chosen to match the thermal coefficient of expansion of the metal being employed. Sealing glasses in a range of thermal coefficients are available from the Corning Glass Works, Corning, New York.

While there have been shown and described what are at present considered to be the preferred embodiments of the invention it will be apparent to those skilled in the art that various changes and modifications can be made herein without departing from the scope of the invention as defined by the appended claims.

What is claimed is:

1. A process for producing a glass-to-metal seal in an apertured metal body which comprises the steps of: positioning said apertured metal body; positioning a metal lead substantially centrally located within said aperture; placing a sealing glass in said aperture; firing said body, lead and sealing glass at a temperature high enough to achieve melting of said sealing glass and effecting a bond between said body, said lead and said glass to form said glass-to-metal seal; grinding at least one surface of said lead flush with said glass; and refiring said body and said glass-to-metal seal.

2. The process of claim 1 wherein said firing is accomplished at a temperature of at least 800° C.

3. The process of claim 2 wherein said refiring is accomplished at a temperature of at least 750° C.

4. The process of claim 3 wherein said refiring is for a time long enough to heal cracks formed in said seal by said grinding.

* * * * *